Patented Feb. 26, 1946

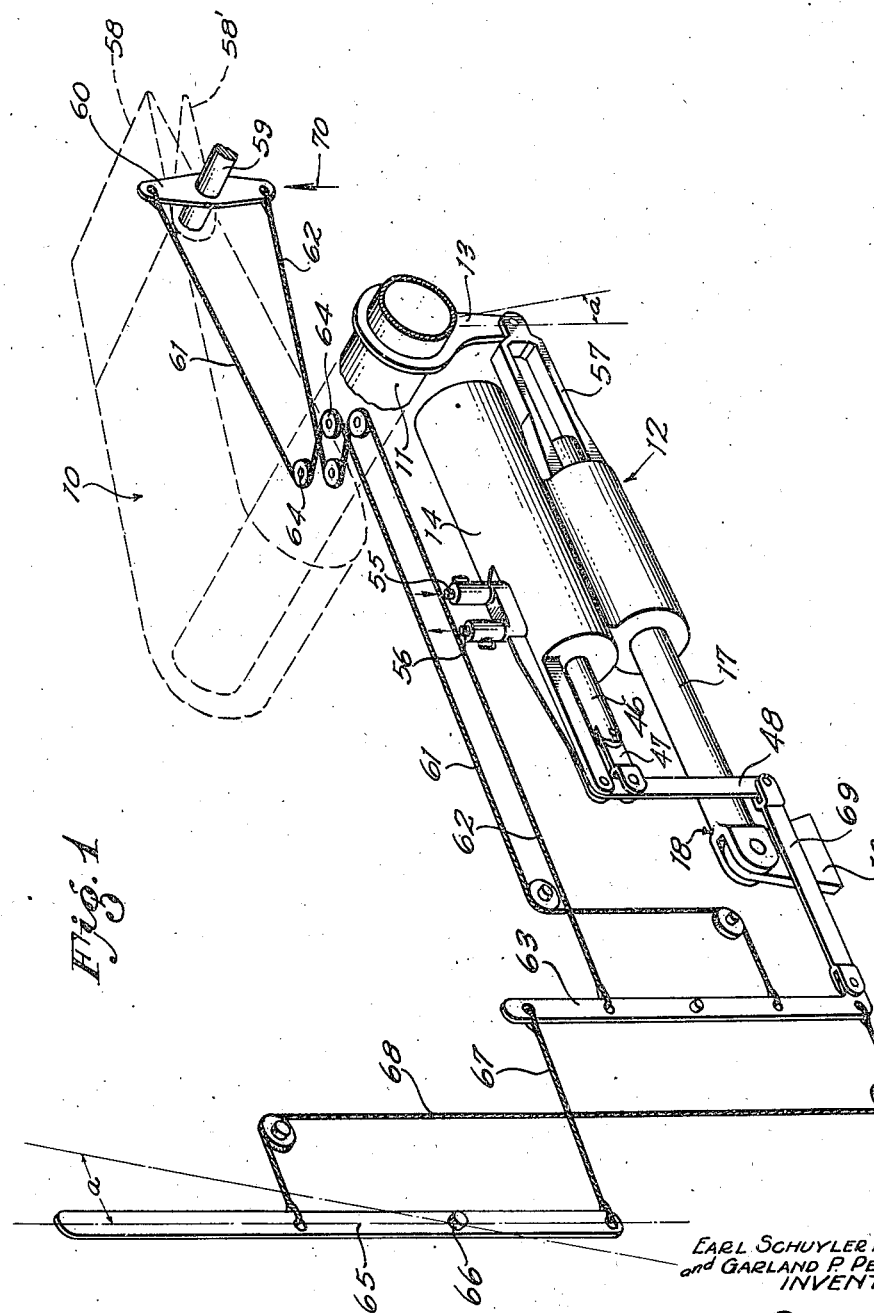

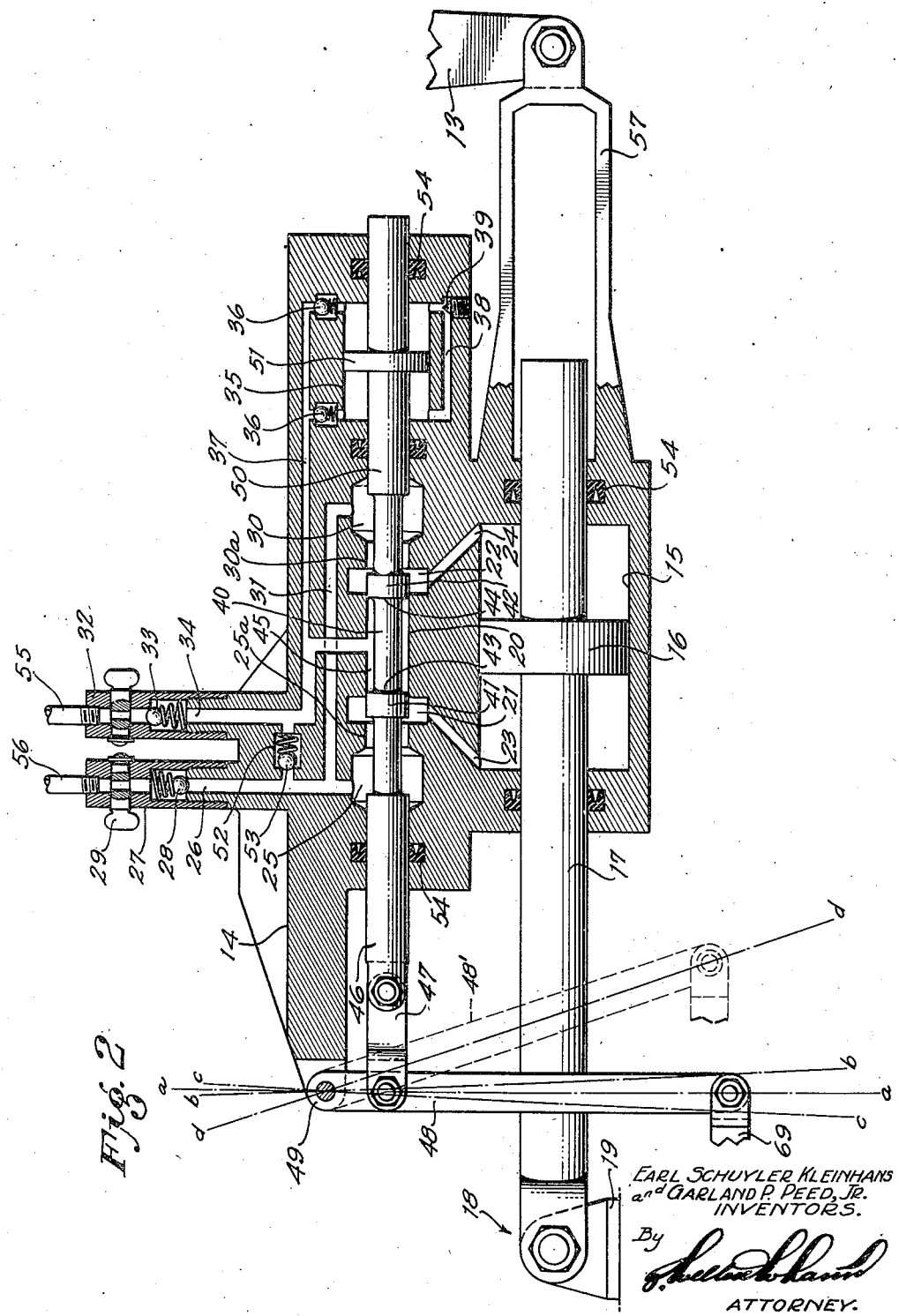

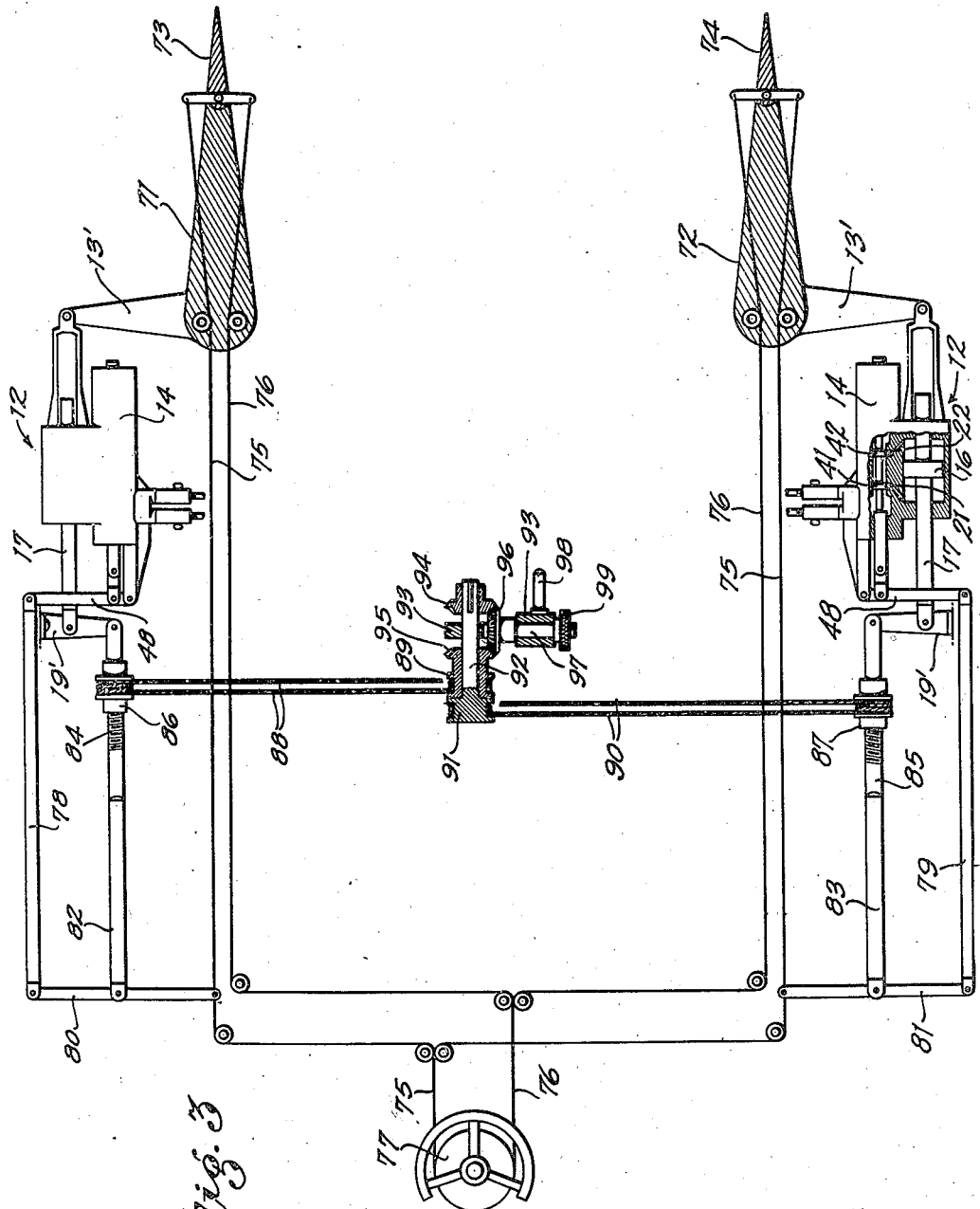

2,395,671

UNITED STATES PATENT OFFICE 2,395,671

CONTROL MEANS FOR AIRFOILS

Earl Schuyler Kleinhans, Santa Monica, and Garland P. Peed, Jr., Pacific Palisades, Calif., assignors to Douglas Aircraft Company, Inc., Santa Monica, Calif., a corporation of Delaware Application September 26, 1940, Serial No. 358,380

14 Claims. (Cl. 244—82)

Our invention relates in general to means for controlling aircraft and relates in particular to means for controlling the movement and positioning of large airfoils of such size that it is advisable to employ application of force other than from a manual source for the movement thereof.

It is an object of the invention to provide a control for an airfoil, such as an elevator, aileron, or rudder, of an aircraft, having means for causing or effectuating movement of the airfoil from one position to a second position and having means acting to maintain the airfoil within a prescribed range of movement or to lock the airfoil substantially against movement by externally applied force, when such airfoil has moved into any selected position in response to the operation of the control means.

It is an object of the invention to provide a control means for an airfoil in association with means by which power may be applied to the airfoil to move or assist in moving the same, this control means having associated therewith or embodied in its construction means for holding the airfoil in the various positions of adjustment which have been selected.

It is a further object of the invention to provide a control means having a pilot operated part movable through selected positions representing positions for the airfoil to assume, this control means embodying means for effectuating the application of a force to move the airfoil toward and into a position selected therefor, and means for limiting the movement of the airfoil beyond the selected position.

It is a further object to provide control means of the character set forth in the foregoing having in association therewith a plurality of sources of power or force each of which is capable of moving the control means, and each of which will operate independently of the other, under control of the control means, to move the airfoil into selected positions.

A further object of the invention is to provide a control means for an airfoil having a locking means to hold or lock the airfoil in a selected position in accordance with the position of a primary positioning and movement determining member, to maintain the airfoil in any position selected therefor, this locking means being effective when all or only a part of the supplementary force exerting means are employed to move the airfoil from one position to another selected position. Herein we have employed the term "lock" to describe the effect of maintaining the airfoil within prescribed limits, as will be hereinafter described in detail.

A further object of the invention is to provide a control for an airfoil having associated means whereby a force to move the airfoil from one position to another is derived by the external application of air pressure, this control means having cooperating parts which will stop the movement of the airfoil when it has reached a selected position corresponding to the position into which a movement and position determining member has been moved. In order to give an understanding of the meaning of the term "movement and position determining member" reference may be made to the control lever which is moved by the pilot or by some automatic control means such as a gyroscope robot.

It is a further object of the invention to provide in association with an airfoil of an aircraft a control means for accomplishing movement of the airfoil from one position to another selected position, including a control tab or flying tab which is movable relative to the airfoil so that a force may be derived from the aerodynamic factors involved to move the airfoil, and a fluid operated means, or fluid motor also connected to the airfoil and being capable of moving same in cooperation with or independently of the action of the control tab.

It is a further object of the invention to provide a means of the character set forth in the preceding paragraph wherein the normal operation of the airfoil is accomplished by external application of air pressure and wherein the fluid operated means acts to assist the external air pressure in moving the airfoil, when the external air pressure is insufficient to alone accomplish a desired movement of the airfoil.

It is a further object of the invention to provide a control means such as set forth in any of the foregoing paragraphs wherein simple and effective means are provided for absorbing or resisting forces derived from the sudden application of air pressure, such as wind gusts, so that such forces will not be applied to the manual control members in such magnitude as to tend to wrench the same from the grasp of the pilot.

A further object of the invention is to provide control means for airfoils constituting the ailerons of an aircraft having simple means whereby the ailerons may be independently adjusted to trim the aircraft, and whereby both ailerons may be caused to droop below the ordinary neutral position thereof when the initial control lever or member in the pilot's cabin is in a neutral position.

Further objects and advantages of the invention will be brought out in the following part of the specification.

Referring to the drawings which are for illustrative purposes only:

Fig. 1 is a schematic perspective view showing a simple form of our invention applied to an airfoil, such as an elevator or rudder of an aircraft.

Fig. 2 is an enlarged schematic sectional view of a form of hydraulic control and/or power unit employed in the practice of the invention.

Fig. 3 is a diagrammatic view showing the manner in which the invention may be applied to the ailerons of an aircraft so as to accomplish complementary operation thereof.

In Fig. 1 we have schematically shown our invention applied to the control of an airfoil 10 such as the elevator forming a part of the tail structure of an aircraft. This airfoil 10 is mounted on or connected to a shaft member 11 which may be a hollow tube. In association with the airfoil 10 which is referred to hereinafter as a "main airfoil," we show a control element 12 which may be operatively connected to the airfoil 10 by means of a lever 13 which is fixed on the shaft member 11. The invention includes means for applying a force to move the airfoil, one form of which will be hereinafter described in detail, and the control element 12 is a supplementary force applying means and cooperates to assure that the airfoil 10 will be stopped and maintained in any position selected therefor by the pilot or pilot control.

The control element 12 is disclosed in detail in Fig. 2. It embraces two relatively movable members including a housing 14 chambered so as to provide a cylinder 15 in which a piston 16 is slidable, this piston 16 being secured to or mounted on a piston rod 17 that constitutes a relatively fixed member, because it has means 18 at its outer end for pivotally connecting it to a fixed bracket 19 which is secured directly to the aircraft structure so as to be held substantially stationary. Adjacent the cylinder 15, the housing 14 has a valve bore 20 with valve ports 21 and 22 at the ends thereof which are respectively connected through ducts 23 and 24 with the front and rear ends of the cylinder 15. Adjacent the port 21 there is a chamber 25 which is connected through an opening 25a with the port 21, and through a duct 26 is connected to an outlet member 27 having therein an outlet check valve 28 and also a manually operable shut-off valve 29. Adjacent to the port 22 there is a chamber 30 having communication through an opening 30a with the port 22 and being connected to the duct 26 by means of a duct 31. The housing 14 is provided with an inlet member 32 having therein an inlet check valve 33 which is connected through a duct 34 with an intermediate portion of the bore 20. The housing 14 has therein a dash pot cylinder 35, the ends of which are connected through check valves 36 and a passage 37 with the duct 34. The ends of the cylinder 35 are also connected by a bypass passage 38 having a flow control valve 39 therein.

A slide valve 40 is disposed so as to extend through the valve bore 20, this slide valve having cylindric valve bodies 41 and 42 at the ends thereof, spaced apart with relation to the length of the valve bore 20 so that the inner shoulders 43 and 44 thereof will lie within the ends of the valve bore 20 when the slide valve is in a neutral position, as shown in Fig. 2, the purpose thereof being to permit a limited movement of the valve member 40 in either direction without opening the fluid space 45 in the valve bore 20 to either of the ports 21 or 22. Also, when the valve 40 is in neutral position the bodies 41 and 42 thereof will be spaced from the openings 25a and 30a, as shown, so that there can be flow of fluid either in and out of the ducts 23 and 24, thereby permitting a flow of fluid through the cross-connecting passage 31 as the piston 16 moves in the cylinder 15. The valve member 40 comprises a bar having a front end 46 which projects from the front of the housing 14 and is connected by means of a link 47 to a lever 48 having one end 49 thereof pivotally connected to the housing 14. The rear end of the slide valve 40 comprises a portion 50 which extends axially through the dash pot cylinder 35 and has thereon a piston 51 resting normally intermediate the ends of the cylinder 35. Accordingly, the rate of movement of the slide valve 40 is determined by the rate of flow of fluid through the bypass passage 38 under control of the valve 39. A unidirectional bypass 52 connects the ducts 26 and 34, this bypass 52 having a check valve 53 therein which permits flow of fluid from the duct 26 to the duct 34 under conditions which will be hereinafter described, but which prevents flow of fluid from the duct 34 to the duct 26. We have diagrammatically shown fluid seals 54 to indicate the required use thereof around certain moving parts of the device.

In the preferred use of the control element 12, the inlet 32 is connected to a pressure line 55 including a flexible connection or hose (not illustrated) in the hydraulic system of an aircraft, and the outlet 27 is connected to a return line 56 of the hydraulic system. When the slide valve 40 is in the intermediate or centralized position, in which it is shown in Fig. 2, the lever 48 will coincide with the line $a$—$a$ which is perpendicular to the axes of the members 17 and 40. Owing to the overlap of the valve bodies 41 and 42 relative to the ports 21 and 22, the lever 48 may be swung back and forth within the range defined by the lines $b$—$b$ and $c$—$c$, without either of the ports 21 and 22 being opened to the pressure of fluid in the space 45. However, should the lever 48 be swung beyond this range of movement, for example, into an angular position such as indicated by the line $d$—$d$, the slide valve 40 will be moved rightward relative to the housing 14 to such extent that communication of the pressure space 45 will be opened with the port 22, and the port 21 will be at this time open through the opening 25a to communication with the release or discharge chamber 25. Fluid under pressure will then flow into the rightward end of the cylinder 15 through the duct 24 so as to cause the cylinder 15 to move rightward relative to the piston 16 which is held stationary by reason of its connection to the stationary bracket 19. Rightward movement of the housing 14 will move the upper end of the lever 48 rightward from the angular position thereof indicated by dotted lines 48', causing the lever 48 to rotate rightwardly around the lower end thereof until the lever is again brought into a position within the range of perpendicular indicated by the line $b$—$b$, at which time the valve bodies 41 and 42 of the slide valve 40 will again close the ports 21 and 22 off from communication with the pressure fluid space 45 and no further hydraulic fluid will be fed to the cylinder and no further movement of the housing 14 relative to the piston 16 will be caused by pressure fluid. From the foregoing explanation it will be perceived that within the range of operation of the device, the housing 14 is caused to follow the movement of the lower portion of the lever 48. This lever 48 is shown in its neutral position in full lines in Fig. 2, and the neutral range of movement of the lever 48 is indicated by the lines b—b and c—c. If the lever is swung in either direction from this neutral range, the housing 14 will be imparted a movement by fluid pressure so as to follow the movement of the lever 48, and the movement of the housing 14 by fluid pressure will correspond to the movement of the lever 48 beyond the neutral range.

The housing 14 is shown with a rightwardly projecting arm 57, which, as shown in Fig. 1, is connected to the lever 13 associated with the airfoil 10. As a means for applying force from one source, to move the main airfoil 10, we have shown a control flap or auxiliary airfoil 58 pivotally connected at the rear edge of the airfoil 10 so as to be swung upwardly and downwardly on a hinge 59. For swinging the flap 58 we have shown a centrally fulcrumed lever 60 from the upper and lower ends of which control cables 61 and 62 extend to a fulcrumed lever 63, these cables 61 and 62 being guided by pulleys diagrammatically indicated at 64. The lever 63 is connected with a control lever 65 which swings on a pivot 66, for transmission of swinging movement from the lever 65 to the lever 63. To indicate this connection we have shown cables 67 and 68 disposed in crossing relation between the levers 65 and 63 whereby clockwise movement of the lever 65 will result in anti-clockwise movement of the lever 63. The lower end of the lever 63 is connected by means of a link 69 with the lower end of the lever 48 of the control unit 12. Accordingly, when movement from the lever 65, which may be herein referred to as the movement and position determining member, is transmitted through the cables 67 and 68, the lever 63, the cables 61 and 62 and the lever 60 to the control flap 58, there will be a corresponding swinging movement of the lever 48. The overlap of the valve bodies 41 and 42, Fig. 2, relative to the valve ports 21 and 22 is of such degree that the control flap 58 may be swung upwardly and downwardly from neutral position within a range of four or five degrees, before either of the valve ports 21 and 22 will be opened to pressure fluid.

The operation of the control arrangement shown in Fig. 1 will be perceived from the following. When the control flap is swung downward from its neutral position, to a position such as indicated by dotted lines 58′, the reaction of air against the control flap 58 will produce an upward force against the rearward edge of the airfoil 10 as indicated by the arrow 70. This force will tend to swing the airfoil 10 upward, but this upward movement will be limited by the control element 12, and such movement of the airfoil will be stopped by the control element 12 in accordance with the position into which the member 65 has been moved. In accordance with the foregoing, the operation of the device, as disclosed in Fig. 1, may be further explained as follows. Should the pilot desire to place the aircraft in climbing position, he will move the upper portion of the control member 65 toward him, or through an angle such as the angle a of Fig. 1, such movement of the member 65 corresponding to the act of the pilot normally referred to as pulling back on the "stick." Tension in the cable 67 will pull the lever 63 in anti-clockwise direction and a pull will be transmitted through the cable 62 to the lower end of the lever 60, thereby swinging the control flap 58 downward so as to produce the force in the direction of the arrow 70 tending to swing the rearward portion of the airfoil 10 upward. When the lever 63 is swung in anti-clockwise direction as before explained, the lower portion of the lever 48 will be swung to the right, whereby the port 22 of the control element 12 will be opened to the pressure chamber 45 so as to permit a flow of fluid through the duct 24 into the rightward end of the cylinder 15 to cause rightward movement of the housing 14 of the control element 12.

It will be remembered that prior to the opening of the port 22 to communication with the chamber 45 no pressure fluid will be fed into the cylinder 15. Also, whether the housing, after movement of the slide valve from neutral position, is moved by fluid pressure in the cylinder 15 or by external application of force from the lever 13 will depend upon the sufficiency of the forces applied by the pressure of air against the control tab 58. Under most conditions of operation, the four or five degree movement of the control tab which is permitted prior to release of pressure fluid by the slide valve will result in "harnessing" a force of air against the control tab of such magnitude that the force transmitted through the lever 13 to the arm 57 will move the housing in the same direction as the slide valve, consequently the valve bodies 41 and 42 will never be permitted to move relative to the housing in an amount sufficient to open the fluid passage from the pressure fluid space 45 of the valve to the cylinder 15. For example, the force indicated by the arrow 70 of Figure 1 will normally result in a pull in rightward direction against the arm 57 so that the leftward head of the cylinder 15 will be urged toward the piston 16 and the entire housing 14 will be moved relative to the slide valve 40. However, in the original movement of the member 65, the slide valve 40 was displaced from neutral simultaneously with the displacement of the control flap 58 by reason of the fact that both the slide valve and the control flap are actuated by the common lever 63. Therefore, so long as it is unnecessary to move the control flap beyond its four or five degree displacement in order to obtain sufficient external force to move the main airfoil, the hydraulic pressure fluid will never be called upon to supplement the external force and the slide valve will accordingly never move a distance sufficient to release the fluid. But, if the four or five degree control flap movement is not sufficient to produce the required movement of the main airfoil, then the control flap is displaced to a greater degree, the slide valve is moved a greater distance relative to the housing 14 and pressure fluid is released to the cylinder 15 to supplement the external force. When this occurs, the control element 12 will function in the capacity of a fluid motor to positively transmit an actuating movement to the airfoil 10. Accordingly, in the operation of the device disclosed in Fig. 1 the hydraulic force in the control element may supplement the force derived from the action of air against the control tab, or the movement of the airfoil 10 may be accomplished by either of these forces singly. Regardless of the source of the power by which movement of the airfoil 10 is accomplished, the control element 12 will operate to limit the movement of the airfoil 10 to correspond with the movement of the movement and position determining member 65. In explanation of this, it may be remarked that the angle $a$, Fig. 1, may be of any value, and that the distance through which the lower end of the lever 48 is swung in response to the movement of the member 65 will be proportionate to the different values of the angle $a$. When the member 65 is moved from a first position to a second position through an angle $a$, the airfoil 10 will be moved through a corresponding angle either by action of the control flap 58 alone, or by the control unit 12 working in conjunction with the control flap 58, and when the airfoil 10 reaches the second position corresponding to the second position of the member 65, and then tends to move further than a prescribed distance beyond this second position, its movement will be stopped by the closing of the opening 25a by the valve body 41, so that there can be no further flow of fluid from the left end of the cylinder 15.

A further feature of the invention is that either of the sources of power above referred to, for moving the airfoil will continue to operate even though one of these sources of power should fail, without sacrificing the control of the movement of the airfoil 10 exercised by the control element 12. For example, should one of the cables 61 be broken so that control of the tab 58 is lost, movement of the airfoil 10 will be accomplished through the application of hydraulic pressure in the cylinder 15 under control of the member 65. On the other hand, should the hydraulic system of the aircraft, of which the members 55 and 56 form a part, become ineffective, force to move the airfoil 10 may be derived from the control tab 58 alone and the control element 12 will merely serve thereafter as a control for the movement and position of the airfoil 10. This controlling action of the control element 12 after failure of the external hydraulic system is made possible by the interposition of the one-way bypass 52 between the return or discharge passage 26 and the pressure passage 34, which will permit a circulation within the housing 14 in keeping with the following explanation. Should the slide valve 40 be moved rightward so as to connect the space 45 with the port 22, a flow of hydraulic fluid from the left end of the cylinder 15 through the port 21, the chamber 25, passage 26, bypass 52, passage 34, space 45, and port 22 to the rightward end of the cylinder 15 will be possible, thereby permitting rightward movement of the housing 14 to allow upward movement of the airfoil 10 in response to upward pressure of air against the flying or control tab 58, which is always swung downward when the valve 40 is moved rightward from neutral position due to interconnection of the control parts which derive their movement from a single source comprising the member 65, Fig. 1.

In Fig. 3 we diagrammatically show our invention in use with the right and left ailerons 71 and 72 of an aircraft, these ailerons are provided with control tabs 73 and 74, each being connected through cables 75 and 76 with a pilot actuated cable drum or control wheel 77. When the drum 77 is rotated in clockwise direction tension will be applied through the cables 76 to swing the control flap 73 downward, and to swing the control flap 74 upward, with the result that the ailerons 71 and 72 will be respectively swung upwardly and downwardly by air pressure exerted against the control flaps associated therewith. Therefore, when the drum 77 is rotated to the right, the right wing of the aircraft will be depressed and the left wing of the aircraft will be elevated. When the drum 77 is rotated in anticlockwise direction, the left wing will be depressed and the right wing will be raised as a result of the upward swinging of the aileron 72 and the downward swinging of the aileron 71. Each aileron 71 and 72 has a control element 12 associated therewith, the construction of these control elements being identical with the construction shown in Fig. 2, with the exception that the valve bodies 41 and 42 are spaced further apart in axial direction so that when the slide valve is in neutral position they will be in centralized and closing relation to the valve ports 21 and 22, and will close the ends of the pressure fluid space 45 and the openings 25a and 30a, with the result that the valve ports are immediately opened when the associated lever 48 is moved from neutral position. Accordingly, in these control elements 12, shown in Fig. 3, the levers 48 have no neutral range of movement. The housings 14 are connected to levers 13' which are in turn connected to the ailerons 71 and 72, and the piston rods 17 of the control element 12 are connected to stationary supports 19' in the wings of the aircraft.

In order that the levers 48 may have movement corresponding to the movement of the drum 77 and of the control flaps 73 and 74, we have shown the swinging ends of these levers 48 connected by links 78 and 79 with levers 80 and 81 which are pivoted on adjustable supports in the form bars 82 and 83 and have the inner ends thereof connected to the upper and lower cables 75. When the drum 77 is rotated in clockwise direction the lever 80 will be rotated in anticlockwise direction and the lever 81 will be rotated in clockwise direction. Likewise, the far lever 48 which is connected to the lever 80 will be swung leftward from the neutral position in which it is shown, and the near lever 48 which is connected to the lever 81 will be likewise swung to the left from the neutral position in which it is shown, with the result that under the control of these levers 48 both of the control elements 12 of Fig. 3 will move in leftward direction, corresponding to upward movement of the aileron 71 and downward movement of the aileron 72. In a like manner anticlockwise rotation of the drum 77 will result in movement of the levers 48 rightward from the neutral positions in which they are shown so that the housing 14 of the control element 12 may move rightward from their shown position in accordance with downward movement of the aileron 71 and upward movement of the aileron 72.

In the ordinary use of ailerons in maintaining lateral level of an aircraft, one aileron moves up while the other moves down. Our invention provides means whereby the ailerons 71 and 72 may be simultaneously adjusted upwardly or downwardly from neutral position, or may be independently adjusted in opposite directions independently of the movement of the drum 77 and of the cables 75 and 76 to trim the aircraft laterally to compensate for variations in loading conditions.

This adjustment of the ailerons is accomplished by swinging the levers 80 and 81 independently of the movement of the upper and lower cables 75, this being attained by moving the supports 82 and 83 which are pivotally connected to the intermediate portions of the levers 80 and 81. For the accomplishment of this result, the supports 82 and 83 respectively have threaded shafts or screws 84 and 85, these screws 84 and 85 being threaded opposite hand and screwing into the threaded bores of drums 86 and 87 which are mounted for rotation on stub shafts 84a and 85a pivotally attached to the supporting brackets 19'. These drums or spools 86 and 87 are without axial movement, and when they are rotated the members 84 and 85 which thread thereinto are moved axially. That is to say, they are swiveled on the stub shafts, but are incapable of movement along the stub shafts; so that when rotated they will shift the bars 82 and 83 longitudinally. A cable loop 88 runs over the spool 86 and over a drive spool 89 which may be located in the cockpit of the aircraft, and a cable 90 runs over the spool 87 and over a spool 91 which is axially aligned with the spool 89. A shaft 92 extends from the spool 91 through the spool 89 and has a lever 93 rotatable on the portion thereof which projects beyond the spool 89. On the outer end of the shaft 92 there is a bevel gear 94, and on the end of the spool 89 there is another bevel gear 95. A third bevel gear 96 is carried by the lever 93 in a position to engage both of the gears 94 and 95. This gear 96 is mounted on the inner end of a radial shaft 97, and is ordinarily clamped so that it cannot rotate. When the lever 93 is rotated by means of its handle 98, the fixed gear 96 will transmit rotation to the gears 94 and 95 so that the spools 89 and 91 will be simultaneously rotated in the same direction on the axis of the shaft 92. This rotation of the spools 89 and 91 will be transmitted through the cables 88 and 90 to the spools 86 and 87, the cables 88 and 90 being so placed that the spools 86 and 87 will be rotated in the same direction when the spools 89 and 91 are rotated by revolving the lever 93 around the axis of the shaft 92. By simultaneous rotation of the pulleys 89 and 91, the control element 12 may be simultaneously actuated so as to move the ailerons 71 and 82 both in the same direction, thereby making it possible to lower both ailerons from neutral position to give them the drooping position desired during the landing of the aircraft.

Adjustment of the ailerons 71 and 72 in opposite directions, independently of the movement of the drum 77 and the cables 75 and 76, is accomplished by rotation of the interlocking bevel gear 96 which is carried by the handle 93. This gear may be rotated by means of a handle or knob 99 at the end of the lever 93. It will be perceived that when the gear 96 is rotated, rotation in opposite directions will be transmitted to the gears 94 and 95 and thence to the spools 89 and 91. Accordingly, with the drum 77 in neutral or centralized position adjustment of the ailerons 71 and 72 in opposite directions to laterally trim the aircraft may be accomplished by rotation of the spools 89 and 91 simultaneously in opposite directions by rotation of the gear 96 while the lever 93 is maintained stationary.

We claim as our invention:

1. In a control for an airfoil of an aircraft, the combination of: a tab movably connected to said airfoil so that it may be moved into a position wherein it will cause movement of the airfoil by air force; an airfoil movement and position determining member movable through a series of positions; means operating in response to movement of said determining member to move said tab; and power means normally permitting free operation of said airfoil by air force derived from said tab and operating in consequence of movement of said determining member when said tab fails to impart to said airfoil a movement corresponding to the movement of said determining member.

2. In a control for an airfoil of an aircraft, the combination of: a tab movably connected to said airfoil so that it may be moved into a position wherein it will cause movement of the airfoil by air force; an airfoil movement and position determining member movable through a series of positions representing a series of positions desired for said airfoil; an operative connection between said determining member and said tab whereby said tab will be moved independently of said airfoil and relatively to said airfoil in accordance with the movement of said determining member, to produce a force to move said airfoil; and power operated control means for said airfoil controlled in turn by said determining member and functioning to correlate the movement of said airfoil to the movement of said determining member.

3. In a control for an airfoil of an aircraft, the combination of: a tab movably connected to said airfoil so that it may be moved into a position wherein it will cause movement of the airfoil by air force; an airfoil movement and position determining member movable through a series of positions representing a series of positions desired for said airfoil; an operative connection between said determining member and said tab whereby said tab will be moved relatively to said airfoil when said determining member is moved, to produce a force to move said airfoil in a direction corresponding to the movement of said determining member; and control means controlled in turn by the movement and positions of said determining member, said control means having stop means moving independently of movement of the airfoil and in accordance with and proportionate to the movements of said determining member, to limit the movements of said airfoil to values corresponding to the movements of said determining member.

4. In a control for an airfoil of an aircraft, the combination of: an airfoil movement and position determining member movable by force through a series of positions representing positions of said airfoil; and a first force applying means and a second force applying means each operating in response to movement of said determining member from a first position to a second position, each by its operation being capable of applying a force separate from the force by which said positioning member is movable to move said airfoil from first to second positions corresponding to said first and second positions of said determining member, one of said means having in association therewith stop means adjustable independently of movement of said airfoil and comprising a substantially stationary part connected to the structure of the aircraft and a movable part connected to said airfoil, with means adjustable independently of movement of said airfoil to stop said airfoil when it has reached a second position corresponding to said second position of said determining member.

5. In a control for an airfoil of an aircraft, the combination of: a tab movably connected to said airfoil so that it may be moved into a position wherein it will cause movement of the airfoil by air force; an airfoil movement and position determining member movable through a series of positions representing a series of positions desired for said airfoil; an operative connection between said determining member and said tab whereby said tab will be moved relatively to said airfoil in accordance with the movement of said determining member, to produce a force to move said airfoil; and control means for said airfoil controlled in turn by said determining member, said control means having a relatively stationary part connected to the structure of the aircraft and movable means connected to said airfoil, with means for stopping the movement of said movable part relative to said other part when said airfoil has moved in a manner corresponding to the movement of said determining member.

6. In a control for an airfoil of an aircraft, the combination of: a tab movably connected to said airfoil so that it may be moved into a position wherein it will cause movement of the airfoil by air force; an airfoil movement and position determining member movable through a series of positions representing a series of positions desired for said airfoil; an operative connection between said determining member and said tab whereby said tab will be moved relatively to said airfoil in accordance with the movement of said determining member, to produce a force to move said airfoil; and control means for said airfoil controlled in turn by said determining member, said control means comprising fluid motor means having relatively movable parts connected respectively to said airfoil and said aircraft, and valve means having controlling connection with said determining member and operating to control the flow of fluid in said motor means whereby the extent of movement of said airfoil will be correlated with the extent of movement of said determining member.

7. In a control for an airfoil of an aircraft, the combination of: a tab movably connected to said airfoil so that it may be moved into a position wherein it will cause movement of the airfoil by air force; an airfoil movement and position determining member movable through a series of positions representing a series of positions desired for said airfoil; an operative connection between said determining member and said tab whereby said tab will be moved relatively to said airfoil in accordance with the movement of said determining member, to produce a force to move said airfoil; control means for said airfoil controlled in turn by said determining member, said control means comprising fluid motor means having relatively movable parts connected respectively to said airfoil and said aircraft, and valve means movable independently of the movement of said airfoil and having controlling connection with said determining member and operating to maintain said valve means in neutral position when said airfoil is in a position corresponding to the position of said determining member and to control the flow of fluid in said motor means when said determining member has been moved from a position corresponding to the position of said airfoil, whereby movement of said airfoil will be correlated with the movement of said determining member; and means for applying fluid pressure to said fluid motor to produce a motivating force on said parts thereof.

8. In an aircraft having left and right airfoils movably connected to the aircraft; a separate control means for each of said airfoils, each of said control means comprising a fluid motor device having relatively movable parts one of which is connected to an airfoil and the other of which is connected to the structure of the aircraft, and separate valve means for each of said fluid motor devices to control the flow of fluid therein; a pilot actuated member connected to said valve means to simultaneously operate the same; and means operable independently of said pilot actuated member to simultaneously or independently operate said valve means, whereby said airfoils may be adjusted to different flying positions during flight and to make trimming of the craft thereby possible.

9. In an aircraft having left and right airfoils movably connected to the aircraft; a separate control means for each of said airfoils, each of said control means comprising a fluid motor device having relatively movable parts one of which is connected to an airfoil and the other of which is connected to the structure of the aircraft, and separate valve means for each of said fluid motor devices to control the flow of fluid therein; a pilot actuated member connected to said valve means to simultaneously operate the same; and means operable independently of said pilot actuated member to independently operate said valve means, whereby said airfoils may be adjusted to trim the aircraft laterally.

10. In a control for an airfoil of an aircraft, the combination of: a tab movably connected to said airfoil so that it may be moved into a position wherein it will cause movement of the airfoil by air force; an airfoil movement and position determining member movable through a series of positions representing a series of positions desired for said airfoil; an operative connection between said determining member and said tab whereby said tab will be moved relatively to said airfoil in accordance with the movement of said determining member, to produce a force to move said airfoil; power means connected to said airfoil so as to be capable of moving the same; and a control for said power means, said control having a part connected to said airfoil so as to be moved in accordance with the movement of said airfoil and a part connected to said determining member, said control operating in response to relative movement of said parts thereof to actuate said power means when movement of said determining member for the purpose of moving said tab has failed to produce a movement of said airfoil corresponding to the movement of said determining movement.

11. In an airfoil control apparatus, the combination of: a movably supported airfoil; an auxiliary airfoil mounted for movement on the main airfoil; said airfoils located in the slip stream during flight and mounted so that the auxiliary airfoil is capable of assuming positions in which the force of the air stream acting upon it exerts a moving force upon the main airfoil; a control member; power actuated means to operate in response to a movement of said control member when the control member is moved from a first position to a second position, for moving said main airfoil from a first position to a second position corresponding to the second position of said control member; said power actuated means including a part connected to said control member and operating when moved by the said movement of the control member from its first position to its second position, to effect a corresponding movement thereof, and then inhibit further movement of the power actuated device, thereby stopping the further movement of the main airfoil; and means connecting the control member to the auxiliary airfoil for moving said auxiliary airfoil by the said movement of the control member, into a position in which the force exerted by the air 12. In an airfoil control apparatus, the combination of: a movably supported airfoil; an auxiliary airfoil mounted for movement on the main airfoil; said airfoils located in the slip stream during flight and mounted so that the auxiliary airfoil is capable of assuming positions in which the force of the air stream acting upon it exerts a moving force upon the main airfoil; a control member; power actuated means to operate in response to a movement of said control member when the control member is moved from a first position to a second position, for moving said main airfoil from a first position to a second position corresponding to the second position of said control member; said power-actuated means including a relatively fixed part and a relatively movable part connected to said auxiliary airfoil; a valve associated with said relatively movable member of the power actuated device and connected to said control member for operation thereby; said valve mounted for movement on the relatively movable member under control of said control member, said valve and said relatively movable member having a neutral relative position in which the relatively movable member will hold the main airfoil stationary; and means connecting the control member to the auxiliary airfoil for moving said auxiliary airfoil by the said movement of the control member, into a position in which the force exerted by the air stream on the auxiliary airfoil imparts force to the main airfoil in a direction to urge it toward its second position.

13. In an airfoil control apparatus, the combination of: a movably supported airfoil; an auxiliary airfoil mounted for movement on the main airfoil; said airfoils located in the slip stream during flight and mounted so that the auxiliary airfoil is capable of assuming positions in which the force of the air stream acting upon it exerts a moving force upon the main airfoil; a control member; fluid operated power means to operate in response to a movement of said control member when the control member is moved from a first position to a second position, for moving said main airfoil by power from a first position, to a second position corresponding to the second position of said control member; said fluid operated means including a relatively fixed part and a relatively movable part connected to the main airfoil; said fluid operated means also including a valve movable on the relatively movable member with means connecting said valve to said control member for actuating the valve thereby; said valve and said relatively movable member having a neutral relative position in which the relatively movable member will hold the main airfoil stationary; and means connecting the control member to the auxiliary airfoil for moving said auxiliary airfoil by the said movement of the control member to its second position, into a position in which the force exerted by the air stream on the auxiliary airfoil imparts force to the main airfoil in a direction to urge it toward its second position; said valve and the relatively movable member operating upon the movement of the control member from its said first position to its said second position, to effect movement of the main airfoil to a second position and thereafter to assume their relative neutral position to stop further movement of the main airfoil and hold it stationary; said fluid operated means constructed so as to permit free movement of the main airfoil upon failure of pressure in the operating fluid, said auxiliary airfoil being then capable of effecting movement of the main airfoil toward its second position.

14. In control means for airfoils, the combination of: an airfoil mounted for movement about an axis; a fluid operated cylinder connected to the airfoil for moving the airfoil about its axis; a piston within the cylinder having a rod extending from the cylinder; means for holding said piston and rod against movement so as to enable the cylinder to move longitudinally along the piston rod and relatively to the piston; a valve movably mounted on the cylinder for controlling flow of the operating fluid into the cylinder; said cylinder having ports, including ports for admitting the operating fluid to each end of the cylinder; said valve and cylinder capable of assuming a neutral position with relation to each other, in which the operating fluid is admitted to both ends of the cylinder; a freely movable control member; a movable rigid part connecting the cylinder to the valve; all of said parts cooperating so that when the control member is moved to move the valve in a certain direction the operating fluid is admitted into the end of the cylinder that will move the cylinder in the same direction in which the valve has moved, the said connection between the cylinder and the valve operating to move the valve into its neutral position relative to the cylinder, so that the valve will admit fluid to each end of the cylinder, thereby arresting the movement of the cylinder and maintaining the cylinder and the airfoil in a stationary position corresponding to the position to which the freely movable control member has been moved, and an auxiliary airfoil hingedly mounted on said first named airfoil, with means connecting said auxiliary airfoil with said control member, said auxiliary airfoil operating when moved into a new operating position by said control member, to exert a force through the agency of the slip stream, upon the first named airfoil urging the first named airfoil in the direction to which it is moved by the fluid operated cylinder.

EARL SCHUYLER KLEINHANS.
GARLAND P. PEED, JR.

Certificate of Correction

Patent No. 2,395,671.  February 26, 1946.

EARL SCHUYLER KLEINHANS ET AL.

It is hereby certified that errors appear in the printed specification of the above numbered patent requiring correction as follows: Page 4, second column, line 34, after "form" insert *of*; page 5, first column, line 43, for the reference numeral "82" read *72*; and second column, line 52, claim 4, before "each" insert *and*; lines 63 and 64, same claim, strike out "adjustable independently of movement of said airfoil"; page 6, first column, line 10, claim 5, after "means" insert the words and comma *adjustable independently of movement of said airfoil,*; and that the said Letters Patent should be read with these corrections therein that the same may conform to the record of the case in the Patent Office.

Signed and sealed this 2d day of July, A. D. 1946.

[SEAL]

LESLIE FRAZER,
*First Assistant Commissioner of Patents.*